United States Patent

[11] 3,589,461

| [72] | Inventor | Archibald J. Butterworth<br>Frimley, Camberley, England |
|---|---|---|
| [21] | Appl. No. | 758,487 |
| [22] | Filed | Sept. 9, 1968 |
| [45] | Patented | June 29, 1971 |
| [73] | Assignee | Sidler Limited<br>Camberley, England |
| [32] | Priority | Sept. 15, 1967 |
| [33] | | Great Britain |
| [31] | | 42,227/67 and 42,228/67 |

[54] PARKING DEVICES FOR MOTOR ROAD VEHICLES
5 Claims, 12 Drawing Figs.

[52] U.S. Cl. .................................................. 180/1 AW
[51] Int. Cl. .................................................. B60k 25/08
[50] Field of Search ........................................... 25/08, B60s 9/20
180/1 AW,
1 A

[56] References Cited
UNITED STATES PATENTS

| 3,202,231 | 8/1965 | Butterworth .................. | 180/1 AW |
|---|---|---|---|
| 3,401,762 | 9/1968 | Butterworth .................. | 180/1 AW |

FOREIGN PATENTS

| 1,123,721 | 8/1968 | Great Britain .................. | 180/1 AW |

*Primary Examiner*—A. Harry Levy
*Attorney*—Young and Thompson

ABSTRACT: This invention relates to parking apparatus for motor vehicles of the kind wherein ground-engaging rollers are mounted at the ends of pivotal arms and in the lowered position raise a pair of the road wheels from the ground so that an adjacent end of the vehicle can move sideways. The invention particularly relates to an adjustable connection of the arms to the vehicle and to a construction of a two-stage hydraulic ram for actuating the apparatus.

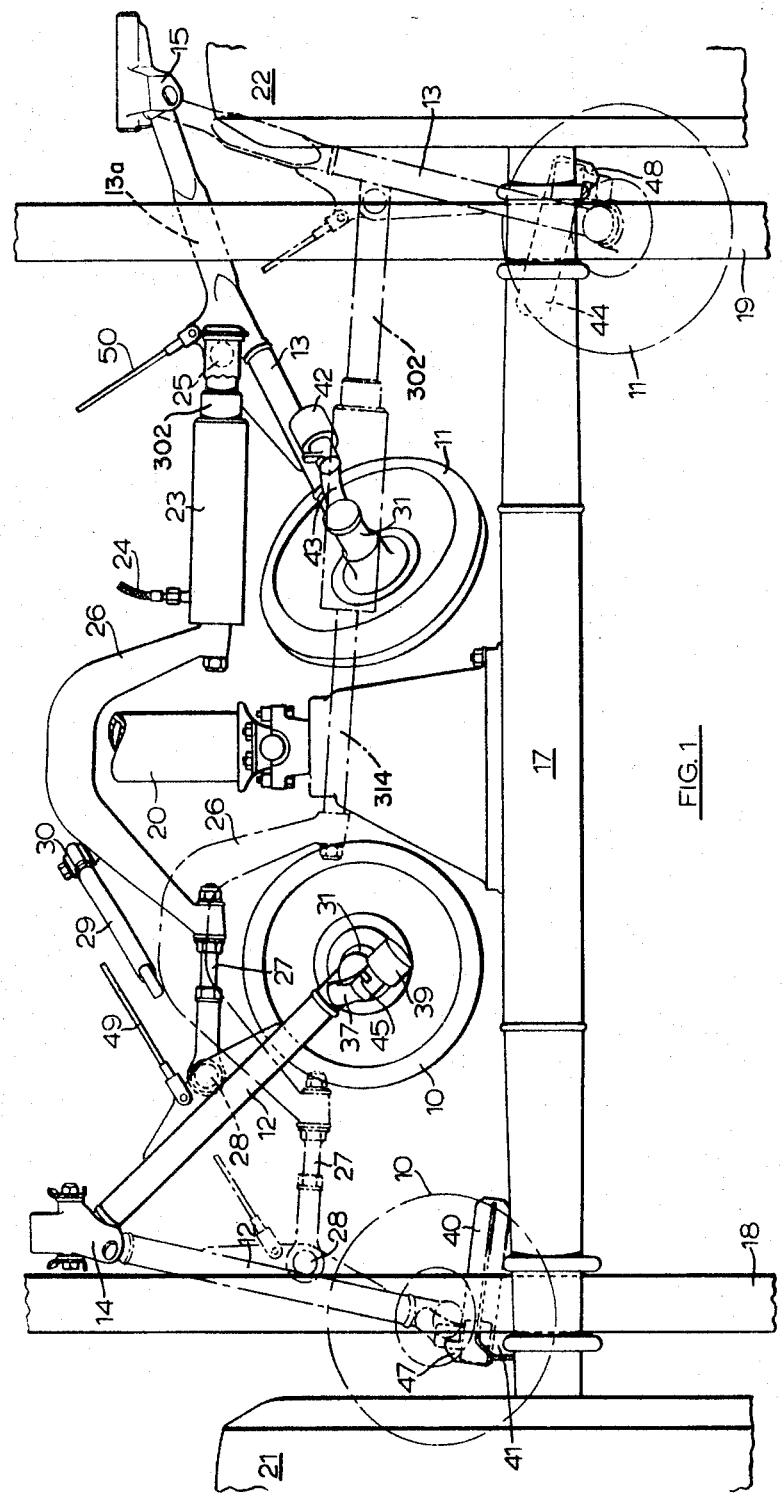

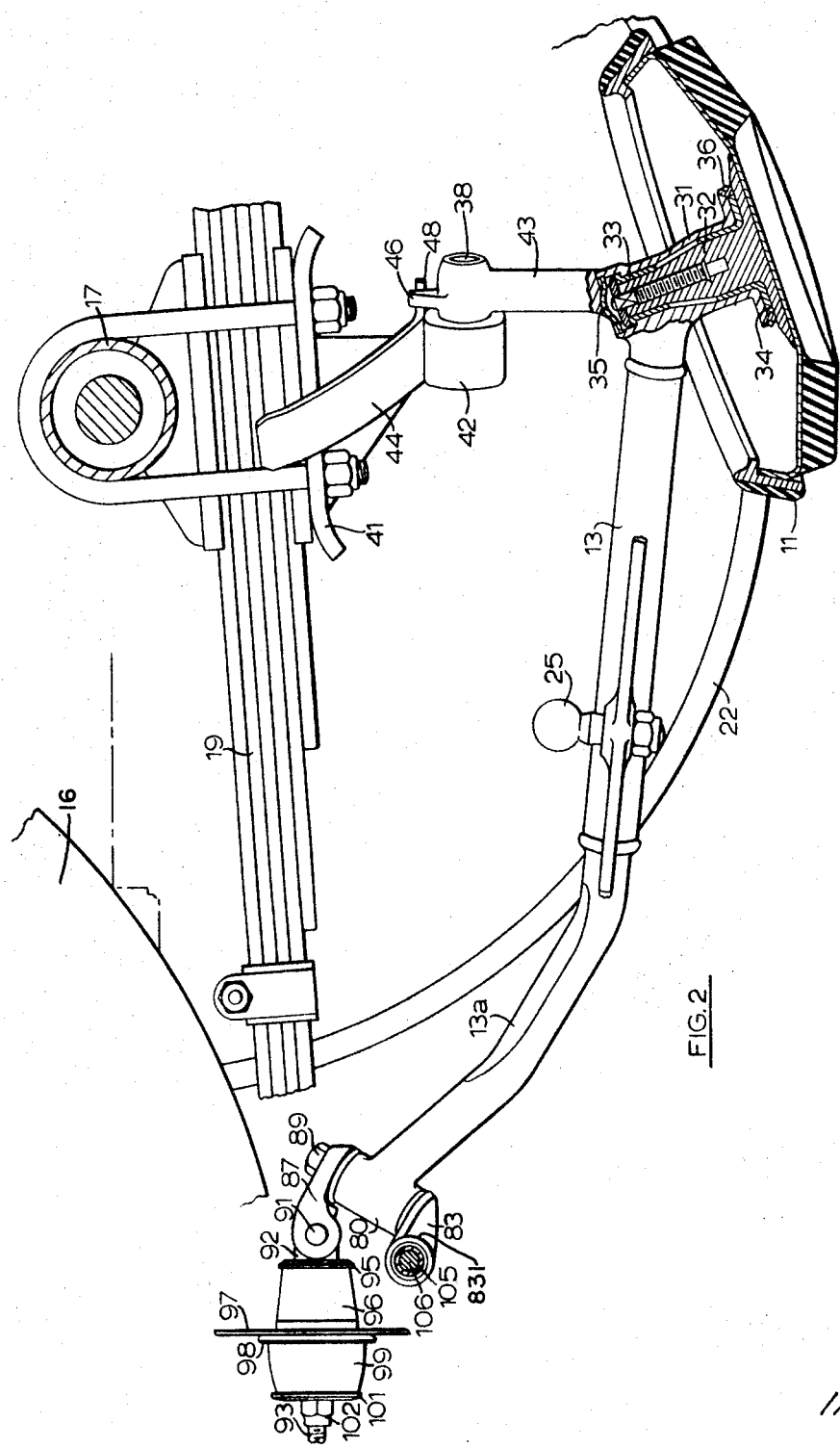

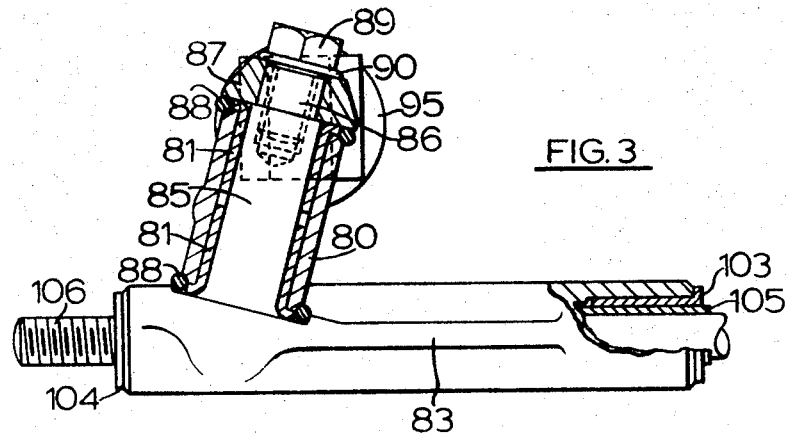
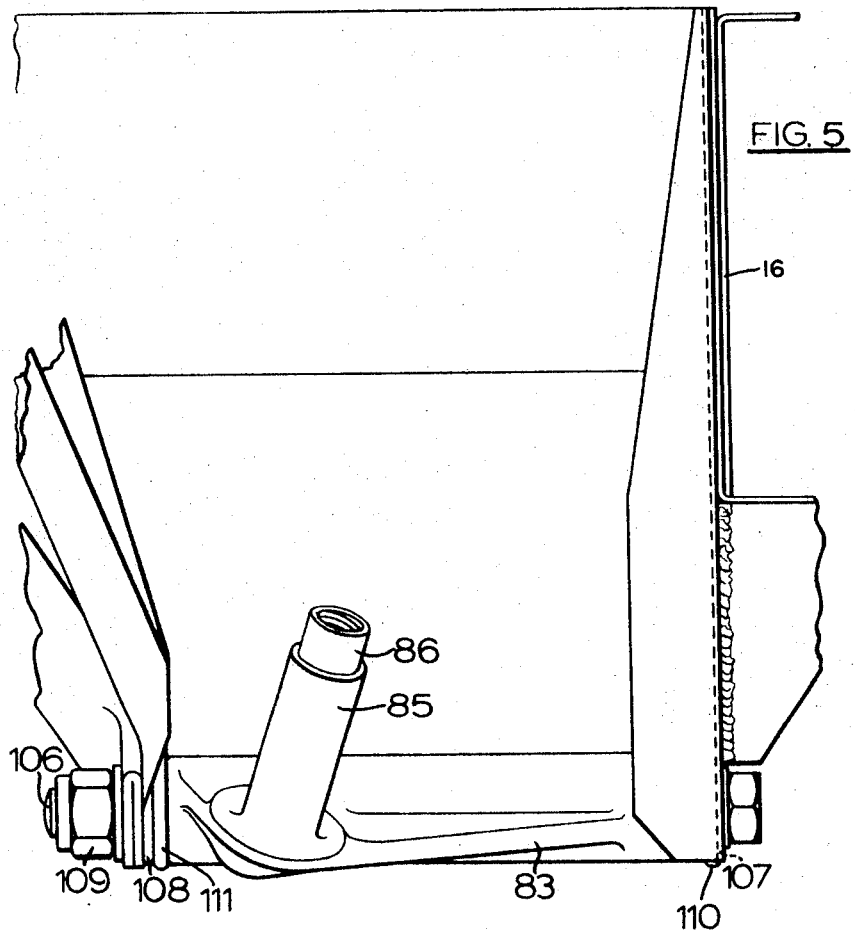

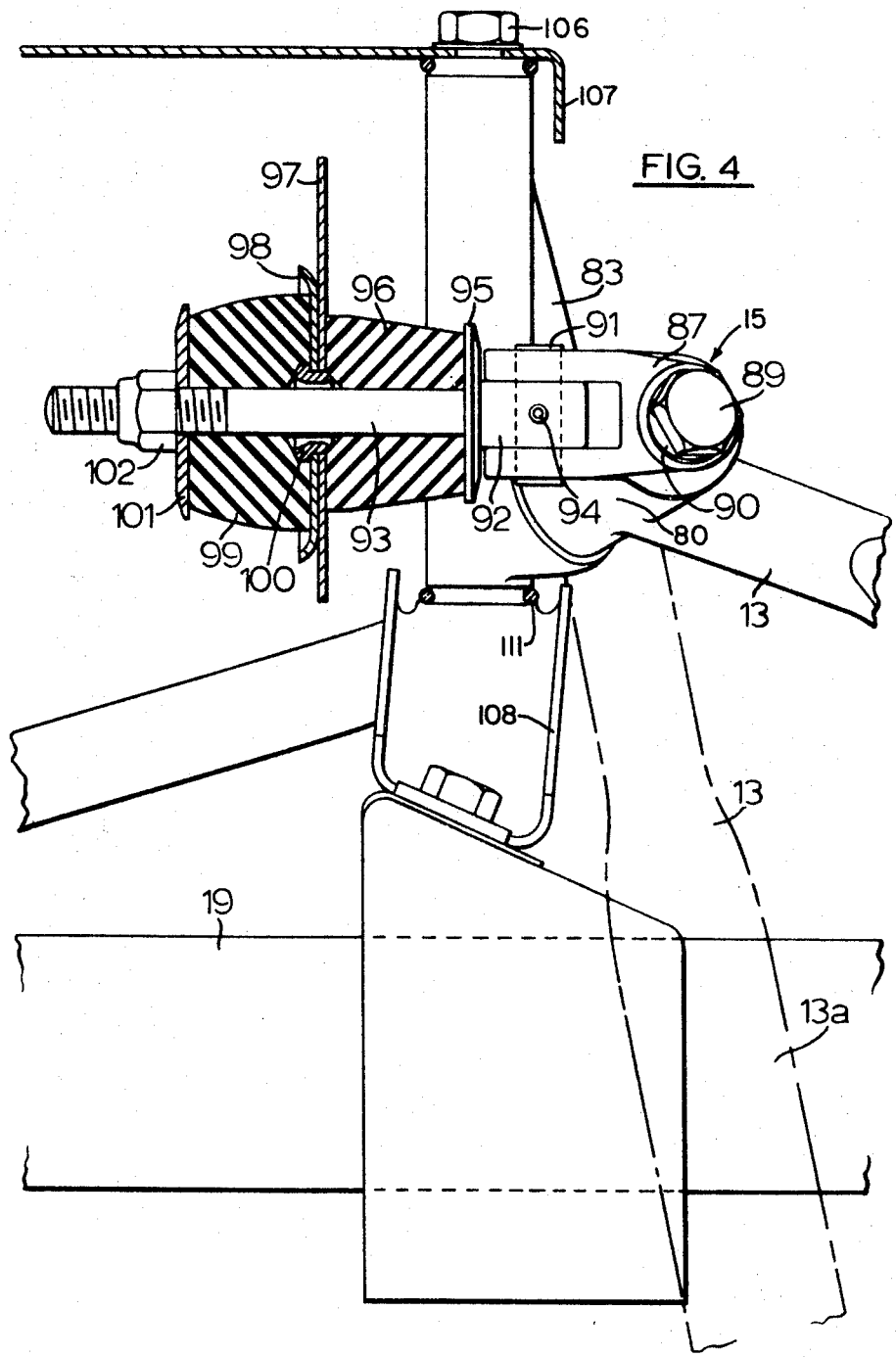

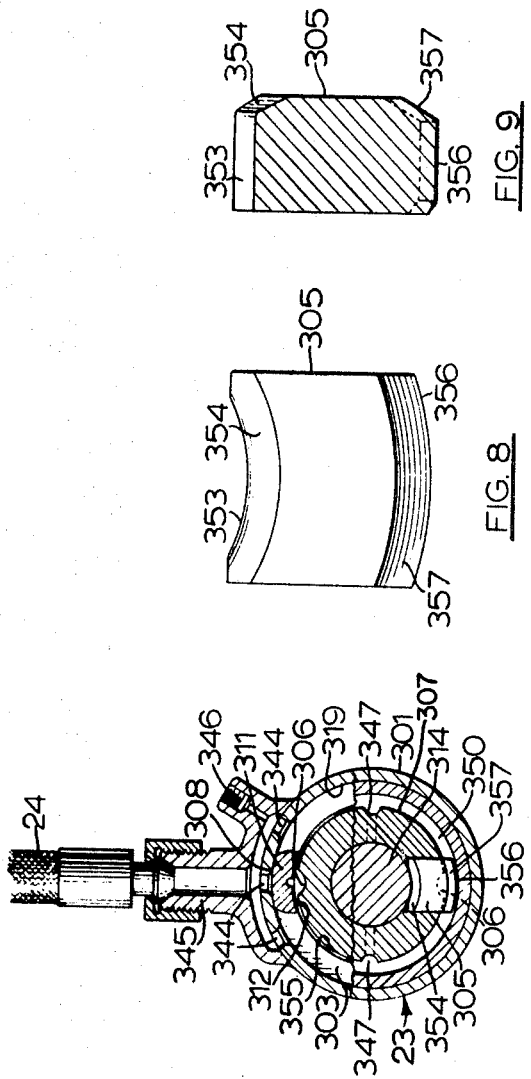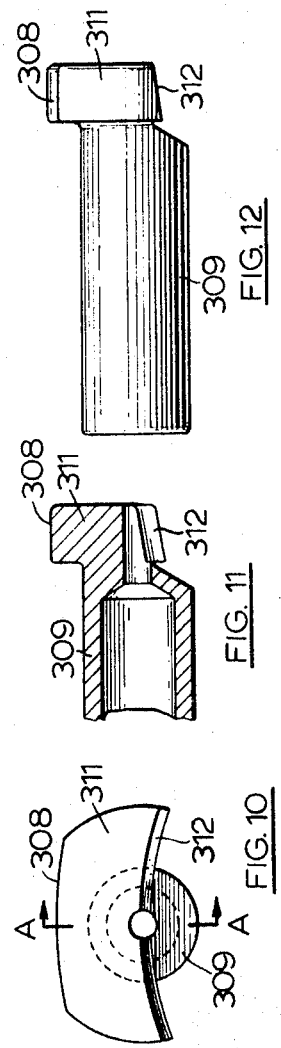

PARKING DEVICES FOR MOTOR ROAD VEHICLES

The invention relates to parking apparatus for motor road vehicles, as disclosed in my U.S. Pat. application No. 482,530, since issued as U.S. Pat. No. 3,401,762, comprising a pair of ground-engaging rollers, a pair of pivotal arms each having one of said rollers rotatably mounted on one end and having its other end adapted to be pivotally connected to the sprung part of the vehicle, power mechanism adapted to swing the arms and rollers downwards and outwards about the said pivotal connections from a retracted position in which the rollers lie close underneath the vehicle to a lowered position in which they engage the ground one at each side of the vehicle adjacent to a pair of road wheels, and cooperating parts on the arms adjacent the rollers and on the unsprung parts of the vehicle adjacent the said road wheels, respectively, effective to impart an upward thrust to the said unsprung parts as the rollers complete their movement into the lowered position and thereby to lift the said pair of road wheels from the ground, the pivotal connection of each arm to the sprung part of the vehicle being constructed to permit resiliently restrained movement about a substantially horizontal transverse axis, whereby the roller and arm are substantially self-sustaining in the desired line of movement while swinging from the retracted position into the lowered position, but can permit vertical movement of the arm and roller relative to the sprung part of the vehicle in the lowered position.

According to the present invention, the pivotal connection of each arm to the sprung part of the vehicle incorporates means for adjusting the resilient restraint against rotation about the transverse axis so as to adjust the height of the equilibrium positions of the arm and roller during the movement into the lowered position. Preferably the pivotal connection of each arm to the sprung part of the vehicle comprises a pair of rubber bushes of different compressibilities, one on either side of a supporting wall on the sprung part of the vehicle, said rubber bushes being placed under compression to provide the resilient restraint against rotation about the transverse axis and means being provided to adjust the compression so as to adjust the height of the equilibrium positions of the arm and roller.

The provision of such an adjustment greatly eases the task of correct assembly of the parking apparatus on the vehicle, so as to ensure that the cooperating parts engage correctly.

The present invention is particularly useful in a parking apparatus in which the power mechanism for moving the rollers comprises a single hydraulic ram disposed substantially horizontally between the two arms and having its opposite ends connected thereto. In such a parking apparatus, the pivotal connections of the arms to the sprung part of the vehicle solely determine the height of the equilibrium positions of the arm and roller and hence the paths swept by them, and by the ram and its connections to the arms, on extension and retraction. If the car in question is of the rear-driven kind having a propeller shaft which rises and falls with spring deflection (i.e. with a rigid rear axle) it can be particularly important to be able to adjust the paths swept by the ram and its connections to the arms to ensure that no contact is made with the propeller shaft.

The hydraulic ram employed is preferably of the kind having a plurality of telescopically disposed pistons providing multistage operation.

In my U.S. Pat. specification No. 3,202,231 I have disclosed a construction of hydraulic ram wherein a small diameter piston is free to extend when fluid pressure is applied inside the ram assembly. At the same time a larger diameter piston is restrained from extending by means of radially acting plungers having outer inclined faces engaged with the similarly inclined face of a recess in the head of the larger piston. The inner surfaces of the plungers abut on to the surface of the inner piston.

When the inner piston is fully extended, a groove on its surface moves into alignment with these plungers, which are then impelled inwards into the groove by the action of the inclined faces above, thus releasing the larger piston, and locking the smaller piston against further axial movement. As the larger piston extends, it uncovers the radial plungers, and would leave them free to move outwards again. To prevent this, a circular keep-ring is caused to follow up the initial movement of the outer piston by means of a spring. This keep-ring has a slightly tapered mouth, and a step formed on its inner surface to arrest its movement when it has moved over the radial plungers.

This construction works satisfactorily, but the manufacture of the keep-ring, and the forming of the deep recess in the cylinder end-cap which is necessary to house the keep-ring and its spring, has proved expensive for large scale production.

An object of the present invention is to provide means of achieving the purpose of this keep-ring and spring by a construction more suitable for low-cost mass production. A further object is to eliminate a possible danger of malfunction caused by the keep-ring tilting or cocking as it follows up the movement of the larger piston.

According to a further feature of the present invention, the power mechanism of the parking apparatus is a hydraulic ram having at least two pistons, wherein the said two pistons are coaxial and arranged to telescope within a housing which is closed at one end by a cap having an inwardly projecting annular boss, radially movable plungers in said boss being arranged initially to lock the larger of the two pistons to the housing, so that the smaller piston extends first, and subsequently to be moved inwards to lock the smaller piston to the housing and to allow the larger piston to extend, spring-loaded keep rods being arranged in the cap and having heads so shaped that on engagement with the plungers, the plungers are retained in their inner positions so long as the larger piston remains extended.

A specific embodiment of the invention will now be described by way of example and with reference to the accompanying drawings, in which:

FIG. 1 is a plan view of the rear axle of a motor car, equipped with a parking roller assemblage which is shown in full lines in the retracted position and in chain-dot lines in the lowered position, FIG. 2 is an elevational view of part of the off-side rear wheel and associated suspension components, viewed from beneath the car, showing the off-side parking roller and its mounting arm in the lowered ground-engaging position, FIG. 3 is a plan view of the pivot of FIG. 2, shown partly in section, FIG. 4 is a detail view, partly in section, of the pivot-piece alone, FIG. 5 is a detail elevational view, looking forwards, of the mounting of the pivot-piece.

FIG. 7 is a transverse section therethrough,

FIGS. 8 and 9 are respectively an elevation and a section through a plunger for use in the ram, and FIGS. 10, 11 and 12 are views to an enlarged scale showing respectively an end view of the keep-rod, a section on the line A-A of FIG. 10 and an elevation of the keep-rod.

Figure 6:
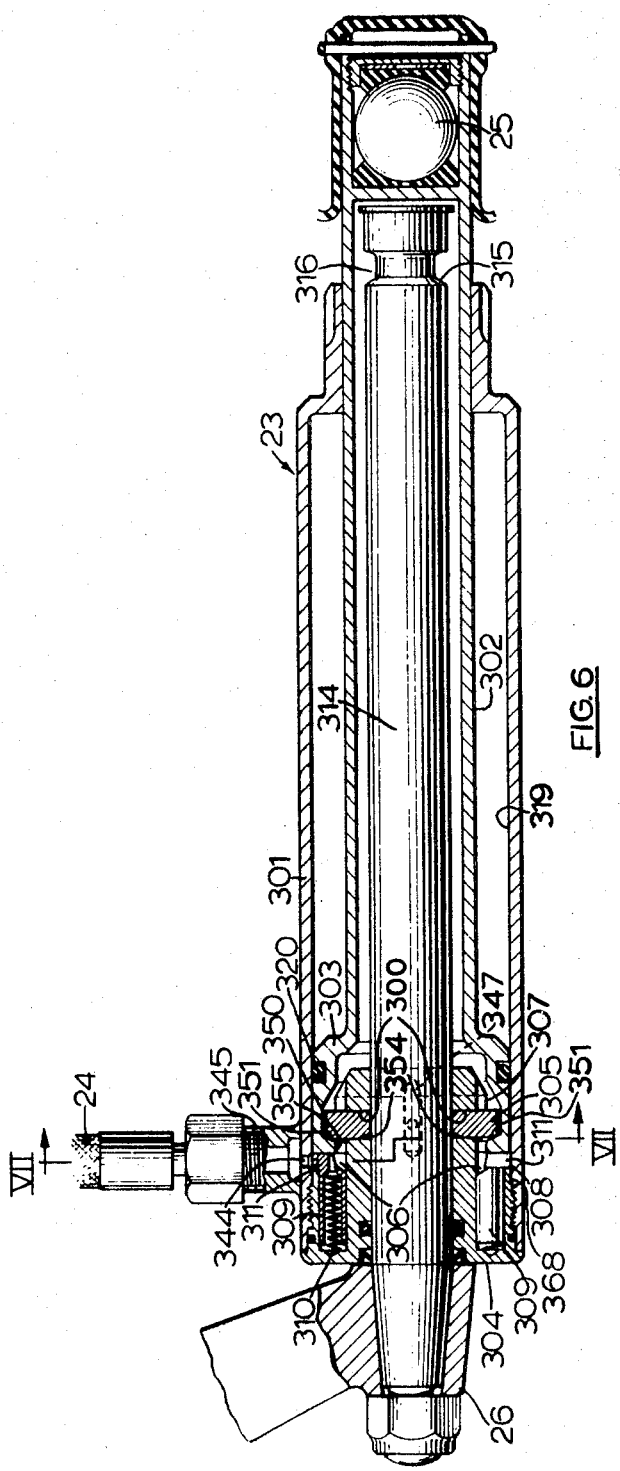
FIG. 6 is a longitudinal section through a hydraulic ram for use in the apparatus of FIGS. 1 and 2.

In FIG. 1, it will be seen that two parking rollers 10, 11 are mounted at the ends of respective arms 12, 13 which are carried through pivots 14, 15 on the chassis frame 16 (FIG. 2) which forms part of the sprung part of the vehicle. The rear axle 17 is attached to the chassis frame 16 through longitudinal leaf springs 18, 19 and is driven by a propeller shaft 20. The tires on the road wheels are shown at 21, 22. In the lowered position the axes of the rollers 10, 11 are inclined oppositely, so that they substantially intersect the axis of the rear axle and the planes containing the roller axes converge towards the front of the vehicle, so that on rotation of the rollers the rear end of the vehicle moves sideways.

The power mechanism for moving the rollers 10, 11, from the retracted position to the lowered position comprises a hydraulic ram 23, supplied with fluid through a line 24, One end of the ram 23 is connected through a ball-joint 25 to the off-side arm 13. The other end is secured to one end of a bow 26 shaped to pass with clearance under the propeller shaft 20. The other end of the bow 26 is rotatably attached to one end of a strut 27 of adjustable length, whose other end is ball-jointed at 28 to the near-side arm 12. The bow 26 and ram 23 are thus free to rotate about the axis of the ram, but they are restrained by a link 29 pivoted at 30 to the bow 26 and at its other end to the floor of the vehicle, which follows the profile of the chassis frame 16 seen in FIG. 2.

As best seen in FIG. 2, a housing 31 is provided at the rear end of each arm 12, 13 and the spindles 32 of the parking rollers 10, 11 are rotatably supported therein on flanged bearings 33, 34. The tops of the housings 31 are each sealed by a dished disc 35 and their bottoms by an external seal retained by a circular spring 36.

Immediately above housing 31 on each arm 12, 13 an extension 37, 43 is formed, carrying a substantially horizontal bore in which is fixed a pin 38 carrying a jack-roller 39, 42. This roller may be slightly barrel-shaped on its outer surface and may be either of metal with any convenient type of bush to act as a bearing, or may be made of an engineering plastic such as nylon of a self-lubricating type.

In FIG. 2 the mechanism is shown in its operating position, in which the jack-roller 42 has been brought by downward swinging of the arm 13 into engagement with a jack-ramp 44, which is attached to the lower road spring attachment plate 41. The downward and outward swinging of the arm 13 brings the parking roller 11 into engagement with the ground, and then forces the jack roller 42 under and along the jack-ramp 44, thus lifting the wheel clear of the ground. It also brings the parking roller 11 into engagement with the rear tire 22, so that driving of the rear wheel causes the roller to be rotated, which imparts sideways movement to the vehicle.

The extensions 37 and 43 both carry upwardly projecting lugs 45, 46 respectively which engage stops 47, 48 on the jack-ramps 40,44 to limit outward movement of the jack rollers 39, 42. Retraction cables 49, 50 are attached to the arms 12, 13 and connected to a single retraction spring (not Shown).

FIG. 2 shows that the parking roller 11 is mounted on the end of arm 13 which carries at its other end a housing 80, into which are compressed flanged bearing bushes 81 (FIG. 3). In this example the pivot-piece 83 comprises a horizontal transverse tubular part 831 and an inclined upstanding journal part 85 (FIGS. 3 and 5). It is mounted on brackets 107, 108 attached to the car frame 16, as shown in FIG. 5, outboard of road spring 19, and arm 13 has a flattened portion 13a so arranged that in the retracted position, as shown in FIG. 1, this flattened portion lies beneath the road spring 19 at a sufficient distance to permit normal vertical movement of the road spring without fouling, and also raised sufficiently high above the road surface to provide satisfactory clearance over rough surfaces.

The inclined journal 85 is formed integrally with pivot-piece 83 and supports bearing bushes 81 of arm 13. At the upper end of journal 85 is formed a reduced portion 86 upon which is mounted lug 87, whose lower face abuts against the shoulder between journal 85 and reduced portion 86, and retains bearing housing 80 in place with an appropriate degree of end-float. Chamfers may be formed at each end of housing 80 and elastic sealing rings 88 may be fitted so as to clear the flanges of bearing bushes 81, and to form a dust and oil seal against the faces of pivot-piece 83 and lug 87 and the opposing shoulders on housing 80.

The lug 87 is a close or interference fit on reduced portion 86, and is secured thereto by a setscrew 89 and washer 90 (omitted for clarity from FIGS. 4 and 5). Setscrew 89 may be of the self-locking type incorporating a pellet of resilient material in a hole drilled through its threaded portion in a known manner and the length of reduced portion 86 is made somewhat shorter than the hole it engages to ensure that lug 87 abuts firmly against the shoulder of journal 85. The other end of lug 87 carries a pivot pin 91, which fits rotatably in holes in lug 87 and may be secured against rotation in the head 92 of eyebolt 93 either by being an interference fit in this component and/or by cross pinning as with the roll-pin 94 or any other convenient means. A suitably proportioned washer 95 and a rubber bush 96 are assembled on to eyebolt 93, before it is passed through an adjacent sheet metal wall 97, which may be part of or attached to the car frame or to mounting brackets 107 or 108 (FIGS. 4 and 5) for pivot-piece 83. A reinforcing plate 98, which may also be arranged so as to modify the action of adjacent rubber bush 99, is located on the further side of wall 97 from lug 87 and passing through both these sheet metal parts is a flanged bush 100, which may be of nylon or other wear-resistant material. The inside diameter of bush 100 may be bellmouthed at both ends, as shown, to permit limited angular movement of eyebolt 93 relative to wall 97, and rubber bushes 96 and 99 may be chamfered at their inner faces to accommodate bush 100. Rubber bush 99, which is of larger diameter and higher spring rate than bush 96, is next assembled on to eyebolt 93 followed by chamfered washer 101, and lock nut 102. Washer 101 is proportioned to resist bending under the maximum deflection likely to be applied to rubber bush 99.

FIG. 5 shows pivot-piece 83 assembled on to suitable brackets 107, 108 attached to the car frame 16, but with the associated components removed. It will be seen that this piece may readily be manufactured by drop forging and subsequent machining of journal 85. Pivot-piece 83 has fitted at each end of its main bore flanged bushes 103 and 104 which bear on journal sleeve 105, which is arranged to be slightly longer than the overall distance between flanges of bushes 103 and 104. A bolt 106 passes through the walls of attachment brackets 107 and 108, nipping journal sleeve 105, and is secured by self-locking nut 109, so as to allow free rotary movement of pivot-piece 83 about journal 105. Chamfers may be formed on pivot-piece 83 adjacent to bushes 103 and 104 to engage external O-ring oil seals 110 and 111. When the parking roller 11 is in its retracted position, it is arranged to lie close up under the floor of the car and is retained there by the tension of the retraction spring cable 50 shown in FIG. 1. In all positions, the assembly is resiliently restrained from rotating about journal sleeve 105 by the rubber bushes 96 and 99, acting as a spring. This spring can readily be adjusted by means of nut 102. Thus tightening of nut 102 raises the equilibrium positions adopted by the arm 13, which enables the assembly to be readily adjusted to the suspension height of the particular car to which it is fitted.

The ram 23 is preferably of the multistage type shown in FIGS. 6 to 10.

In FIG. 6 a cylinder 301 has sliding in it an outer piston 302 with a recessed head 303. A screwed cap 304 closes the left-hand end of cylinder 301. The inner portion 307 of the cap is of reduced diameter and has two diametrically opposed radial slots 300 carrying radially movable plungers 305. Two axial holes 306 are formed in cap 304, and these may conveniently be drilled and reamed before turning the reduced diameter 307. The axial holes 306 extend nearly to the left-hand end of cap 304 and into them are fitted keep-rods 309 and springs 310. It will be seen that each keep-rod 309 has a head 311 whose outer convex surface 308 is so formed that it slides in contact with the bore 319 of cylinder 301. The concave inner surfaces 312 of the heads of keep-rods 309 are formed to a small conical angle so that the head of the keep-rod is analogous to a section of a circular keep-ring. The inner piston 314 slides in a bore in the cap 304 and has a groove 316 with a conical surface 315 at one end. The ram acts between a ball joint 25 secured to the outer piston 302 and a connection 26 secured to the inner piston 314.

The function of this type of two-stage hydraulic ram is to provide a rapid movement of the parking device from the retracted position to the position where the principal working cycle of the ram commences. With the ram shown, the initial extension takes place by movement of inner piston 314 to the left, the outer piston 302 being locked to the cylinder 301 by plungers 305 in the fixed end cap 304 engaging in a groove 350 in the head 303 of outer piston 302. On full extension of inner piston 314, plungers 305 are moved radially into groove 316 by action of a conical face 351 of groove 350 acting on the corresponding faces of plungers 305, thus freeing the larger piston 302. When the piston 302 is thus released and commences its working stroke, the axial compressive load on the ram assembly will be very much greater than the hydraulic force tending to keep the smaller piston 314 extended. Piston 314, therefore, will move inward slightly until the inclined face 315 of groove 316 engages with corresponding inner inclined faces 354 of plungers 305. As a result, an outward force will be generated. Initially the plungers 305 are restrained against moving outwardly under this outward force by contact between their heads and the cylindrical bore 355 of piston head 303.

Keep-rods 309 follow up the movement of piston 302 until some part of the conical inner surfaces 312 of heads 311 makes contact with the outer surfaces of plungers 305, which are still restrained axially against the outward force by the bore 355 of piston 302. The purpose of the small conical angle of faces 312 of the keep-rods is to ensure that plungers 305 are prevented from moving radially further outwards, even to a slight degree, after piston 302 recedes from them, as any such further movement might prevent the function of the interlock mechanism on subsequent retraction of the piston 302. If keep-rods 309 were located only by their fit in holes 306, this radial force might place an excessive bending load on the tubular portions of the keep-rods, and might also introduce resistance due to cross-binding, when piston 302 is required to push keep-rods 309 back into their holes during the retractive part of the cycle. It is for this reason that the outer convex surfaces 308 of keep-rod heads 311 are arranged to be in sliding contact with the bore 319 of cylinder 301. The radial force mentioned above can safely be transmitted through keep-rod heads 311 to cylinder bore 319 without applying stress to the tubular portions of the keep-rods 309.

The oil feed to the ram may be applied either to an extension (not shown) of cap 304 or, as shown, directly to the wall of cylinder 301 immediately to the left in FIG. 1 of the position of the head 303 of outer piston 302 in the contracted condition of the ram.

The annular space between the head 303 of piston 302, and the shoulder 368 of cap 304 is obstructed locally by heads 311 of keep-rods 309 until piston 302 has been released by plungers 305. For this reason it is desirable that the oil feed through the wall of cylinder 301 should be by a number of holes 344 connecting the inside of the ram to feed block 345, shown more clearly in FIG. 7. The inner edges of these holes 344 where they join bore 319 of cylinder 301 are chamfered at a suitable angle to facilitate passage, during assembly, of an O-ring seal 320 fitted to piston 302. Holes 344 should be spaced apart so that not more than one of them can be obstructed by head 311 of keep-rod 309. A tapped hole and seat 346 (FIG. 7) for a bleed screw, not shown, may conveniently be located on feed block 345.

To facilitate passage of oil from the annular space between the keep-rod heads 311 to the interior of outer piston 302, in order that the pressure may act on the end of inner piston 314, two further holes 347 similar to holes 306 are drilled in the right-hand face of cap 304 before machining to form shoulder 368 so that only half of each of these holes 347 are left when the piece is finished as can be seen in FIG. 7.

When the parking apparatus is no longer required to be extended, a control valve which supplies it with fluid under pressure will be pushed to the "Off" position, and hydraulic pressure will be released. The apparatus must then be withdrawn to its inoperative position, conveniently by spring means.

As soon as hydraulic pressure is released inside the ram, the pull of such retraction spring means (not shown) acting through cable 49, 50 (FIG. 1) and bow 26 and the ball and socket joint 25 will cause piston 302 to move leftwards relative to cylinder 301 until its head 303 meets the protruding heads 311 of keep-rods 309, and will push them leftwards compressing springs 310. Piston head 303 will then pass over the outer surfaces of plungers 305 until the latter are aligned with the recess 350 in head 303. At this stage plungers 305 will be forced outwards into recess 350 by the action of the conical surface 315 on the left-hand side of groove 316 in inner piston 314. When plungers 305 have moved fully outwards the main diameter of piston 314, which is joined to conical face 315 by a suitable radius, will be able to pass between the plungers 305 and piston 314 can then return to its fully retracted position as shown in FIG. 6.

My U.S. Pat. No. 3,202,231 I described a preferred form of plungers 305. These were rectangular in cross section, sliding in corresponding broached rectangular holes in cap 304, and both their inner and outer profiles were struck from the same center i.e. they were simple sections of a circular ring. In the improved form of plunger shown in FIGS. 8 and 9, the inner surface 353 has a radius corresponding to that of the main diameter of inner piston 314, and the female conical surface 354 adjacent to it is machined from the same center. The outer cylindrical surface 356 on the other hand, and the male conical surface 357 adjacent to it, are struck from a different center, such that the cylindrical radius corresponds to that of the bore 355 at the mouth of outer piston 302, joining its end face to the conical face of recess 350. As a result, when the plunger 305 has moved inwards far enough to be about to disengage from the recess 350, its outer curvature matches that of the bore 355, giving a line contact instead of point contact and consequently a smoother transition in operation.

In manufacture, four plungers 305 may be cut from a circular ring on which the inner profiles have already been formed. These part-finished pieces may then be located in a suitable fixture around and in contact with a mandrel of such diameter that the inner surfaces of opposite pairs of plungers are the same distance apart as when they are at the inner limit of their movement in the actual ram assembly. The outer cylindrical surfaces 356 of the plungers may now be finished to the same diameter as bore 355 of piston 302, and the male conical surface 357 and the radius connecting these surfaces may be formed at the same setting.

I claim:

1. In a parking apparatus for a motor road vehicle, comprising a pair of ground-engaging rollers, a pair of pivotal arms each having one of said rollers rotatably mounted on one end and having its other end pivotally connected to the sprung part of the vehicle, power mechanism adapted to swing the arms and rollers downwards and outwards about the said pivotal connections from a retracted position in which the rollers lie close underneath the vehicle to a lowered position in which they engage the ground one at each side of the vehicle adjacent to a pair of road wheels, and cooperating parts on the arms adjacent the rollers and on the unsprung parts of the vehicle adjacent the said road wheels, respectively, effective to impart an upward thrust to the said unsprung parts as the rollers complete their movement into the lowered position and thereby to lift the said pair of road wheels from the ground, the pivotal connection of each arm to the sprung part of the vehicle being constructed to permit movement of the arm about a substantially horizontal transverse axis, and said pivotal connection incorporating means for resiliently restraining such movement of the arm about said transverse axis, whereby the roller and arm are substantially self-sustaining in the desired line of movement while swinging from the retracted position into the lowered position and vice versa but can execute vertical movements relative to the sprung part of the vehicle in the lowered position; the improvement in which said pivotal connection comprises screw adjuster means secured to the arm, said resilient restraining means acting between said screw adjuster means and the sprung part of the vehicle whereby adjustment of said screw adjuster means swings the arm and roller vertically about said axis to adjust the height of the equilibrium positions of the arm and roller.

2. Parking apparatus according to claim 1 wherein said resilient restraining means comprises a spring acting about said horizontal transverse axis and said screw adjuster means comprises a nut member adjustable to very the initial setting of said spring.

3. Parking apparatus according to claim 2, wherein the sprung part of the vehicle includes a supporting wall adjacent to said pivotal connection and said spring comprises a pair of rubber bushes of different compressibilities, one on either side of said supporting wall, said rubber bushes being placed under compression to provide the said resilient restraint against rotation movement of the arm about the transverse axis and said nut member being effective to adjust the compression of said rubber bushes.

4. Parking apparatus according to claim 3, wherein the pivotal connection comprises a pivot-piece having a horizontal transverse tubular part mounted for pivotal movement about the transverse axis, an inclined upstanding journal part on which the end of the arm is mounted for pivotal movement about an axis inclined to the vertical, and a lug on the upper end of the journal part, and said screw-adjuster means also comprises a bolt which is connected to said lug and which passes through the rubber bushes and the supporting wall, said nut member being carried on the free end of said bolt for adjusting the compression of the rubber bushes.

5. Parking apparatus according to claim 4 wherein the rubber bush on the side of the supporting wall remote from the pivot piece is less compressible than the rubber bush adjacent the pivot piece.